April 21, 1964   C. L. FAUST ETAL   3,130,138
ELECTROLYTIC CUTTING
Filed Nov. 27, 1959
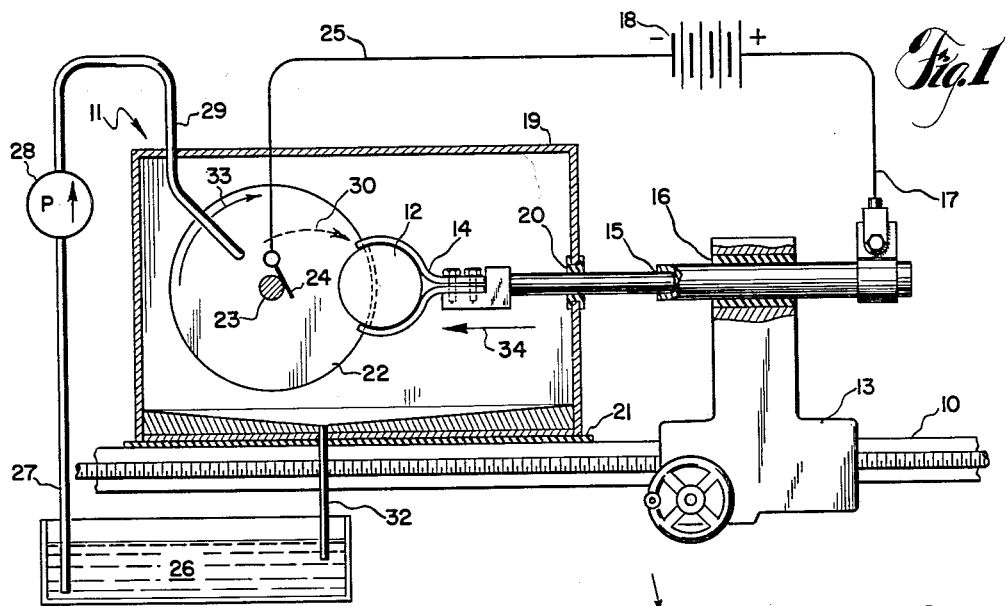
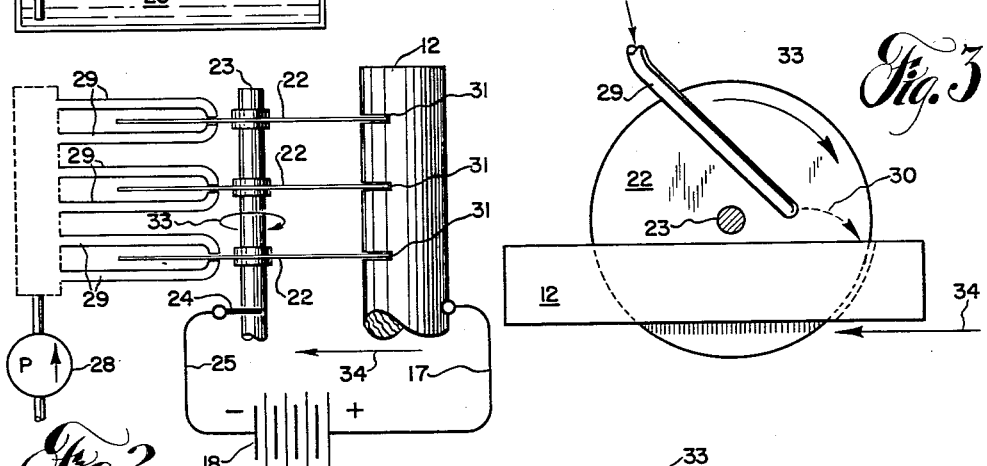
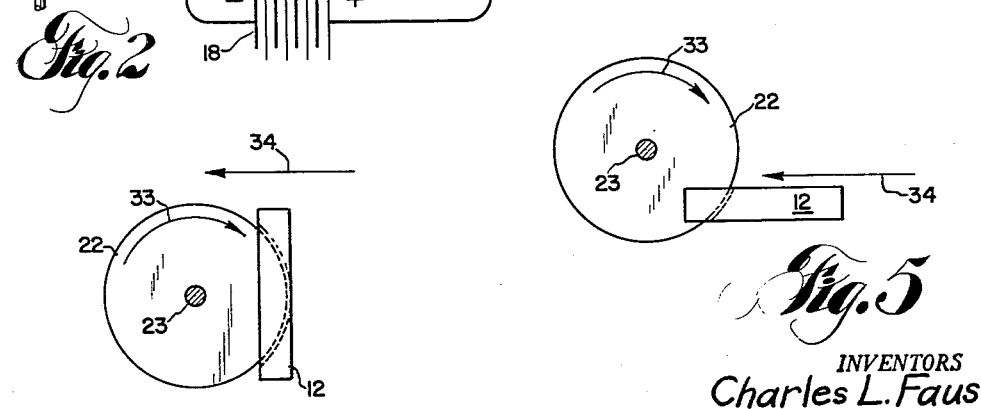
INVENTORS
Charles L. Faust
BY John E. Clifford
Gray, Mase
& Dunson
ATTORNEYS United States Patent Office 3,130,138
Patented Apr. 21, 1964

3,130,138
ELECTROLYTIC CUTTING
Charles L. Faust and John E. Clifford, Columbus, Ohio, assignors, by mesne assignments, to The Battelle Development Corporation, Columbus, Ohio, a corporation of Delaware
Filed Nov. 27, 1959, Ser. No. 855,678
7 Claims. (Cl. 204—143)

The present invention relates to a method of and apparatus for electrolytically cutting into an electrically conductive mass.

Electrolytic cutting has advantages over mechanical and heating methods of cutting metals. Electrolytic methods provide cuts that are free from mechanical or thermal strain and thus do not disturb the gain structure of the cut material. Electrolytic cutting methods also avoid the burrs and jagged edges and the loss of metal as dust or other small particles in mechanical cutting or as a vapor that is evaporated or burned away where a cutting flame is used. Known electrolytic cutting methods are slow, however, and remove more metal than is desirable because they involve the use of robber electrodes on each side of the cutting cathode and because of the current conditions that are required in connection with the robber electrodes. Such methods are disclosed in U.S. Patent 2,739,935. Other so-called electrolytic cutting methods, if they provide accuracy, are used to assist or be assisted by abrasive surfaces or they achieve metal removal by discharge of arcs or sparks. Such methods are shown by U.S. Patents 2,826,540; 2,813,966; and 2,815,435; and none of the methods completely avoids mechanical disturbance of the cut surface.

The present invention provides the advantages of electrolytic cutting methods as mentioned above and avoids the disadvantages of prior electrolytic methods. Faster, thinner cutting is provided by the present apparatus and method. Robber electrodes, which are essential to the methods of the above-mentioned U.S. Patent 2,739,935, are not used. Other advantages are also apparent from the disclosure herein.

The present invention includes a method of and apparatus for electrolytically cutting into an electrically conductive mass, comprising the steps of, and means for: connecting the mass to the positive side of a direct current supply; connecting to the negative side of the direct current supply at least one electrically conductive rotatable disk; placing the mass in close proximity to each disk and maintaining a gap of about 0.0005 to 0.025 inch, preferably 0.001 to 0.010 inch, between the periphery of each disk and the adjacent portion of the mass; rotating each disk at a peripheral speed of at least about 3000 feet per minute, preferably at least about 10,000 to 20,000 feet per minute; supplying an electrically conductive electrolyte throughout each gap; and maintaining a voltage of about 2 to 25 volts, preferably about 6 to 15 volts, between each disk and the mass, to provide a current density of at least about 50 to 2000 amperes per square inch, preferably at least about 150 to 1500 amperes per square inch, through the electrolyte in each gap. The mass preferably is moved toward each disk or the disk is moved toward the mass along a straight line parallel to the plane of the disk at substantially the rate at which material is removed from the mass adjacent to the gap. The region between each side of each disk and the adjacent portion of the mass preferably is maintained open to minimize the distance between the side of the disk and the mass and thus to minimize the thickness of the cut made in the mass adjacent to the disk. In other words, there preferably are no obstructions such as layers of insulation or robber electrodes mounted on the side of the disk or located by any other means in the region between the sides of the cathode cutting disk and the anode mass. Nor are there such obstructions as abrasive particles for scraping or spacing. The electrolyte preferably is supplied to at least one side of each disk at a location spaced from the periphery thereof to form on the side a film of the electrolyte that is transported by centrifugal force from the location to the gap.

When electrolytic cutoff is patterned after conventional abrasive cutoff by replacing the abrasive wheel with an electrically conductive metal disk and by replacing the coolant with an electrolyte for anodic metal dissolution and by directing the electrolyte to flood the cutting zone much as conventional coolant is directed, unsatisfactory results are obtained. Whereas a separation of metal is accomplished, the method is not practical in industry for cutoff because a wide V-shaped cut is produced with exorbitant loss of metal and with unsquare cut sections. In addition to the desired electrolytic action at the periphery in the direction of advance of the disk, there is undesirable electrolytic action from the sides of the disk tending to widen the walls of the cut far beyond the original disk width.

The tendency toward excessive cut widths can be partly minimized by the use of an electrically insulating coating on the sides of the disk which prevents direct electrolytic action over the short distance between the side of the disk and the wall of the cut. However, where a large excess of electrolyte is supplied as by hap-hazard cooling schemes to the cutting zone, even this method of insulating is not completely satisfactory. Because of "throwing power" of electrolysis, part of the current from the periphery of the cathode disk continues to act on the side walls of the cut and causes continual widening as forward cutting proceeds.

A method of counteracting this undesirable current distribution is described in U.S. Patent 2,739,935. By the use of "robber" electrodes on each side of the disk, the undesirable side cutting is said to be reduced. However, the disadvantages of this method are inherent in the bulky construction and cost of the "sandwich-type" cutting disk. The composite disk is made up of five separate disks: (1) a "robber" disk, (2) an insulating disk, (3) the essential cathode disk which accomplishes the cutting, (4) another insulating disk, and (5) another "robber" disk. Such a "sandwich" construction is expensive to make and additional electrical circuitry is required to provide the desired voltage to the "robber" electrodes. In addition, the auxiliary disks add considerably to the over-all thickness of the cutting tool and thus produce larger cut widths than the ideal minimum, the thickness of the central cathode cutting disk.

The present invention provides all of the advantages of electrolytic cutoff obtained by prior methods, yet avoids their disadvantages and provides further advantages not previously available. In the present invention, by controlling the supply of electrolyte to the cutting zone and rapidly rotating the cathode disk at speeds much higher than those normally used in conventional cutoff, such as by means of abrasive wheels, greatly improved results are obtained in thinness of cut and speed of cutting, along with other obvious advantages arising from the simplicity in design that has been achieved. In the practice of this invention it is preferred to use cathode disk speeds above about 3000 feet per minute and up to 20,000 feet per minute and higher depending on mechanical design considerations. The use of extremely high disk speed with safety is made possible because there is no physical contact of the disk with the work. For example, if abrasive wheels were rotated at such extremely high speeds, the stress in the wheel at the periphery when combined with the added stress of physical force on the work in chip-by-chip cutting would approach the limiting tensile or shear stress of the wheel with the possibility of unexpected wheel explosions. In addition, any physical contact of a rotating tool with the work would require enormous increases in horsepower to overcome friction and force needed to tear metal fragments out in achieving rotational speeds of the order of 20,000 feet per minute.

In the present invention a number of cuts can be made simultaneously. It is clear that metal cutting according to the present invention is accomplished with complete absence of pressure on or contact of the disk with the mass being cut. Thus, the loading on the drive mechanism is only that of overcoming inertia of the rotating element and of friction, which at most is only a fraction of the horsepower required to drive such equipment as an abrasive cutoff wheel, a hack saw, a circular saw, etc. Therefore, a multiple of electrolytic cutting disks can be mounted on the same shaft for multiple slotting, cutting off, or other purposes, with only minor increase in motivating power. On the other hand, multiple cutting of a single mass with abrasive wheels, circular saws, hack saws, band saws, etc., on one shaft is highly impractical not only from a power standpoint, but also from one of cost, because jamming of one mechanical cutting tool will stop the machine by breaking itself and many of the other cutters and possibly damaging the whole machine. Furthermore, multiplication of such pressure-applying cutting tools increases the bulk of the entire tool needed to avoid detrimental vibration.

Productivity is thus increased per man and per machine by using the multiple electrolytic cutting of this invention. For example, in cutting off billets for forging, ten to thirty or more pieces are simultaneously cut from one billet. Presently known methods require that the billet be firmly clamped in position to resist the force of the mechanical cutting tool, fastest of which is the oscillating abrasive cut-off wheel (fastest, that is, in terms of the time from the moment the wheel starts to cut until it finishes it). Such time might be in seconds, but the cutting off of one piece takes two minutes or more because of the operator time to move the billet in place, clamp it firmly, locate and set the disk, and remove the cut-off piece. Thus, speed simply of cutting is not expressive of tool productivity.

With multiple electrolytic cut-off the same operator can set the billet, which has no pressure on it and is simply held in position, and cut off ten or more pieces at one time. Thus, in a given number of minutes or so his productivity and that of the machine are greatly increased. With 7½-inch diameter billets of titanium, for example, oscillating abrasive-wheel cut-off machines have a productivity of 40 pieces per day per machine at best. With multiple electrolytic cutoff, daily productivity is 200 or more pieces.

Besides the obvious saving in cutting time, multiple cutting provides substantial savings of cost and time for handling materials before and after the cuts. Smooth, thin, accurate cuts are provided by the present invention, without pressure of the disk on or contact with the mass being cut. Therefore, the disk need be thick enough only to maintain its own shape while rotating. By comparison, bonded abrasive cut-off wheels, mill saws, circular saws and such which must cut by applying the great force necessary to cut metal chip-by-chip must be thick enough to avoid fracture or bending of the cutter-tool. Because of this thickness, kerf loss is significantly greater than the kerf loss with electrolytic cutting by the present invention. For cutting such relatively costly metals as titanium, tungsten, niobium, and their alloys, and such other alloys as those of cobalt, chromium, nickel, etc., for high temperature, germanium, selenium, etc., the savings because of the much less kerf loss can be in dollars per cut whereas the cost of making a cut is expressed in cents. Even on such low-cost metal as mild steel, the cost per cut-off billet for forging is only about one half that of cut-off with a circular saw, because of much less kerf loss. The advantage of this narrow-cut feature is especially obvious to anyone who must cut the costly metals and alloys needed in high-temperature environments of missiles, supersonic aircraft, and nuclear equipment.

A further practical advantage of this invention is that each cut surface, being completely free from any damaged surface, can be directly inspected for any metallurgical flaws. This is especially advantageous where performance needs dictate thorough inspection, as for each piece to be forged into a turbine bucket. Billets and other processing pieces cut by heretofore known methods must be further polished (abrasive finishing, after which the pieces still are not free from surface disturbance), lapped and etched, at additional cost in dollars and in delay.

Such direct-inspection aspect of cut surfaces does not result when surfaces are cut by known methods of electrolytically assisted abrasive cutting because, even though the pressure is light, scratching and slight deformation hide the true metallurgical condition. Because there is no contact with or pressure on the mass being cut in the present invention, hardness of the mass is no factor. Thus, the very hard metals and others, such as beryllium, which are sensitive to stress cracking are not damaged when cut in our apparatus.

In the drawings:

FIG. 1 is an elevational view, partially in section and partially schematic, of apparatus according to this invention;

FIG. 2 is a top view, partially schematic, of part of the apparatus of FIG. 1;

FIG. 3 is an elevational view of a modification of a portion of the apparatus of FIGS. 1 and 2;

FIG. 4 is a schematic view illustrating a feature of the invention; and

FIG. 5 is a view similar to FIG. 4.

In the apparatus of FIG. 1, a lathe bed 10 serves as a basis piece of equipment for an electrochemical cutting apparatus 11. Any other suitable equipment, such as a milling machine, which can provide or be modified to provide the necessary cathode and anode support and movement, electrolyte flow system and shield, current carrying, etc., can be utilized. The apparatus 11 provides cuts in an anode mass 12 through the controlled advance of the anode mass 12 by the lathe threading mechanism, with suitable reduction gearing, acting through the lathe carriage 13.

A typical cut-off operation is carried out as follows: The mass 12, which is to be cut, is attached by at least one clamp 14 to an anode holder 15, which is held by the lathe carriage 13 and is electrically insulated therefrom by insulation 16. The anode holder 15 is connected, as indicated at 17, to the positive side of a direct current supply 18. The anode mass 12 is positioned inside a spray box or splash hood 19. The cover box 19 may be made of insulating material or may be provided with insulation 20 to insulate it from the anode holder 15, and with insulation 21 to insulate it from the lathe bed 10.

Electrically conductive disks 22 are mounted at spaced positions on a shaft 23 within the cover box 19. The disks 22 make electrical contact with the shaft 23, which is electrically conductive and makes contact also with a brush contact 24, which is connected, as indicated at 25, to the negative side of the direct current supply 18. A motor (not shown) rotates the shaft 23, as indicated by the arrow 33, at sufficient speed to provide to the disks 22 a peripheral speed of at least about 3000 feet per minute.

A reservoir of electrolyte 26 furnishes electrolyte through tubing 27, a pump 28, and tubing 29 to the sides of the disks 22. Each outlet of the tubing 29 supplies electrolyte to one side of a disk 22 at a location spaced from the periphery thereof to form on the side of the disk 22 a film of the electrolyte that is transported by centrifugal force, as indicated by the arrow 30, to the gap 31 (FIG. 2) between the periphery of the disk 22 and the adjacent portion of the mass 12. The tubing 29 is located away from the mass 12, leaving the region between each side of each disk 22 and the adjacent portion of the mass 12 open, as the region is also free from any other obstructing objects such as auxiliary robber electrodes, to minimize the space between the side of the disk 22 and the mass 12 and thus to minimize the thickness of the cut made in the mass 12 adjacent to the disk 22. For clarity, the spacing is greatly exaggerated in FIG. 2. It is of the order of about 0.01 inch on each side of the disk. The electrolyte passes downward through the end gaps 31 and drains into tubing 32, which conveys it back to the reservoir 26.

The lathe threading mechanism, acting through the lathe carriage 13, advances the anode mass 12, as indicated by the arrow 34, so as to maintain the desired spacing, about 0.0005 to 0.025 inch, preferably about 0.001 to 0.010 inch, in the space 31 between the periphery of each disk 22 and the adjacent portion of the mass 12.

The desired rate of advance of the anode mass 12 is provided by utilizing the carriage advance setting that matches the electrolytic metal dissolution rate.

FIG. 3 shows a slight modification of the apparatus 11 to provide long cuts, with the mass 12 passing below the shaft 23. Other modifications may be made, of course, to handle objects of various shapes and sizes, and to cut slots where it is desired to do that rather than to cut the material apart. The mass and the disks can be mounted and moved in a wide variety of ways, with either or both being moved toward the other as the cutting proceeds. Supplying the electrolyte at a location on the disk that may be remote from the object to be cut makes the apparatus readily adaptable for various cutting needs. Where such adaptability is not needed, the electrolyte can be fed in any appropriate manner, as by supplying it to the periphery of the disk near the cutting region.

The rate of electrolyte flow for best results depends on several factors, such as the size of the mass being cut, the diameter of the disk, the speed of rotation of the disk and the point of application of electrolyte to the disk. The optimum electrolyte flow can best be described in terms of the thickness of the electrolyte film on the side of the disk. Since the side wall of the electrolytically cut mass is generally spaced about 0.010 inch from each side of the disk, it is important that the thickness of the electrolyte film be not more than 0.010 inch. Otherwise undesirable side electrolytic action would occur or an insulating coating would be required on the sides of the disk. The minimum thickness of electrolyte on the disk is that which supplies sufficient electrolyte to the cutting zone to allow electrolytic metal removal at the rate of advance of the disk. In practice, the minimum electrolyte thickness on the side of the disk is observed to be that at which visible sparking is absent. It is desirable to use the least amount of electrolyte flow compatible with the desired cutting operations, in order to minimize the pumping requirements and the electrolyte "drag" on the disk for high-speed rotation. A method of adjusting the electrolyte flow and electrolyte thickness on the disk is to incorporate a "bypass" in the line supplying electrolyte to the disk. A portion of the electrolyte can be bypassed in accordance with visual observations of the electrolyte film thickness on the disk. A preferred range of electrolyte thickness on the disk is about 0.0005 to 0.005 inch. To maintain the film thickness in the desired range requires a change in total flow depending on the design and operating conditions. For example, an increase in the disk diameter, an increase in the disk rotational speed, an increase in the distance from the mass at which the electrolyte is applied to the disk, or an increase in the size of the mass being cut generally require an increase in electrolyte flow to maintain the desired electrolyte thickness on the side of the disk.

Electrolytic removal of metal is according to Faraday's law of electrolysis, and metal removal is related to the number of coulombs of electricity passed. The intensity of current that can be applied to a preselected area of the mass depends on the proper selection of electrolytic conditions, and can be determined by routine experiment. It has been found that in the practice of this invention the largest obtainable current density is approximately proportional inversely to the square root of the dimension of the mass perpendicular to the feed direction in the plane of the disk and directly to the 0.6 power of the peripheral speed of the disk. From this it is clear that high disk speed is important.

Within the broad range of current densities from zero to the limiting current density as defined previously, the desired electrolytic dissolution rate is calculated from Faraday's law, and the feed of the anode mass relative to the disk is set at this rate. The dissolution rate will keep up with the feed rate to maintain the gap between the anode mass and the cathode tool. If the feed rate were reduced, the gap and the resistance across it would tend to increase, causing the dissolution rate to decrease until it matched the lower feed rate. If the feed rate were increased, the gap and the resistance would tend to decrease, causing an increase in dissolution rate until it matched the higher feed rate. If the feed rate were set higher than the fastest possible dissolution rate indicated by the limiting current density, the gap would become too small, causing arcs and sparks; and finally the anode mass and cathode tool would come into physical contact. Arcing, sparking, and physical contact of the anode mass and the cathode tool are undesirable, as they would reduce the efficiency of the process and could cause surface damage both to the anode mass and to the cathode tool.

Maintaining the recommended gap between the periphery of each disk 22 and the adjacent portion of the mass 12 provides a substantially constant current density for a given voltage. Where the instantaneous area of the cut varies, as in cutting through a cylinder, the current density nevertheless remains virtually constant because the total current varies proportionately with the cutting area. With the proper rate of advance of the lathe carriage, the recommended gap is maintained and smooth, thin cuts are provided with no sparking or arcing during the cutting process.

The velocity of the electrolyte flowing through the cutting zone increases as the speed of rotation of the disk is increased. It is desirable to move the electrolyte through the cutting zone at a high speed in order to keep the electroyte in the cutting zone fresh, to sweep out the reaction products, and to avoid overheating the electrolyte as it passes through the cutting zone.

In the mechanical cutting of rectangular sections having a long and a short dimension, it is preferred to cut through parallel to the long dimension in order to obtain the highest cutting rate in terms of cross section cut per unit time. A short contact path is desirable to allow adequate cooling of the tool, and easier removal of chips to prevent tool clogging and to reduce the friction encountered and the power that must be applied to the tool.

In the electrolytic cutting of rectangular sections the opposite is true; it is preferred to cut through parallel to the shortest dimension as shown in FIG. 4. While a cut parallel to the longer dimension as in FIG. 5 would permit a higher linear feed rate, the cut parallel to the shorter dimension as in FIG. 4 allows the greater cutting rate in terms of cross section cut per unit time. This feature can be described in another way: as the square cross section desired to be cut is increased, there is an increase in the cross section cut per unit time by the electrolytic method of this invention.

Disks 20 inches or more in diameter as thin as 0.1 inch and 8 inches in diameter as thin as 0.036 inch have been used. The disks need only be thick enough to remain rigid and retain their positions at the speed at which they are rotated. The cuts produced by any disk generally are about 0.01 inch thicker on each side of the disk. The electrolyte film on the side of the disk is only about half as thick as the space between the disk and the object being cut. Since the electrolyte on the side of the disk does not contact the cut material, it is not necessary to insulate the side of the disk. Thus, the thickness of the cut is reduced to a minimum.

*Example I*

Using an electrolyte containing 225 grams per liter of sodium chloride and 25 grams per liter of boric acid, pieces were cut off from a 2-inch by 2-inch bar of SAE 1020 steel. The cathode disk was 8 inches in diameter by 0.044 inch thick. The disk speed was 16,000 feet per minute, the feed rate was 0.065 inch per minute, and the current density was 500 amperes per square inch at 11 volts. The average width of cut was 0.076 inch and the surface finish was 25 to 50 microinch R.M.S. The deviation from squareness was 0.0075 inch per inch of cross section. The surface finish is adequate for most subsequent uses of the cut-off pieces as for forging and extrusion. The deviation from squareness is within the allowable limits for upset forging.

*Example II*

Using the same conditions as for Example I, a ½-inch by ½-inch piece of SAE 1020 steel was cut off using a feed rate of 0.183 inch per minute and a current density of 1488 amperes per square inch at 11 volts. A ¾-inch by ¾-inch piece of SAE 1020 steel was cut off using a feed rate of 0.162 inch per minute and a current density of 1240 amperes per square inch at 11 volts. These results and those of Example I illustrate the decrease in feed rate required as the stock size increases. However, the cross-sectional area cut per unit time increases with increasing stock size. This is a desirable characteristic not common to conventional cutoff methods where the cross-sectional area cut per unit time decreases as the stock size increases.

*Example III*

Using an electrolyte containing 250 grams per liter of sodium chloride and 25 grams per liter of boric acid, an 8-inch diameter cathode disk rotated at 7200 feet per minute, and a voltage of 10–12 volts, a bar of 1.2 inch diameter high-temperature alloy A–286 (iron, 54.6%; nickel, 25.6%; chromium, 14.6%; molybdenum, 1.2%; manganese, 1.2%; titanium, 2.0%; vanadium, 0.2%; aluminum, 1.4%) was cut off at a feed rate of 0.073 inch per minute at a current density of about 700 amperes per square inch. Similarly, a ½-inch diameter rod of high-temperature alloy Inco 700 (nickel, 46%; cobalt, 29%; chromium, 15%; aluminum, 3.2%; molybdenum, 3.0%; titanium, 2.2%; iron, 0.8%; silicon, 0.25%; carbon, 0.13%; manganese, 0.08%) was cut off at a feed rate of 0.100 inch per minute. This example illustrates the fact that alloys of different chemical composition can be cut with the same neutral electrolyte that was used in Example I.

*Example IV*

For certain metals an acid-type electrolyte is desirable. A 1.5-inch-diameter bar of unalloyed titanium (55,000-p.s.i. maximum-yield-strength range) was cut at a feed rate of 0.032 inch per minute using an electrolyte containing 68 milliliters per liter of hydrofluoric acid (specific gravity 1.20), 107 milliliters per liter of nitric acid (specific gravity 1.42), and 125 milliliters per liter of hydrochloric acid (specific gravity 1.19).

*Example V*

For certain metals, an alkaline electrolyte is desirable. A tungsten rod of 1¼-inch square cross section was cut off using an electrolyte containing 200 grams per liter of sodium hydroxide. A feed rate of 0.040 inch per minute was used at 10–12 volts. The cathode disk speed was 7200 feet per minute using an 8-inch diameter disk of Type 316 stainless steel 0.040 inch thick. The cut surface had no heat-affected layer and was free of microcracks which can occur in conventional cut-off methods, such as abrasive cutoff.

*Example VI*

Three cuts were made simultaneously as shown in FIG. 2 into a 1-inch-diameter bar of AISI 4340 steel (annealed to about 185 Brinell hardness). The electrolyte was the same as for Example I and the cathode disk speed was 7200 feet per minute. The feed rate was 0.071 inch per minute and the current density was about 550 amperes per square inch at 11 volts. With the same conditions, three cuts were made simultaneously into another piece of the 1-inch-diameter bar of AISI 4340 steel which had been hardened to about 550 Brinell hardness.

This example shows that electrolytic cutting is independent of metal hardness and metal structure (pearlite or martensite) for metals of the same chemical composition. There was no change in hardness for the electrolytically cut surface of the hardened piece of steel. The example also shows the applicability of the process to cut off without surface damage of steels having strengths up to 250,000-p.s.i. tensile strength.

The example also illustrates the increases in production that can be achieved by multiple tooling to accomplish three cuts in the time normally required for one cut.

*Example VII*

Three cuts were made simultaneously into a 1.2 inch diameter bar of high temperature alloy M–252 (nickel, 53.8%; chromium, 19%; cobalt, 10%; molybdenum, 10%; titanium, 2.5%; manganese, 1.1%; aluminum, 0.8%; silicon, 0.7%) at a feed rate of 0.050 inch using the same conditions as for Example VI. This alloy is typical of a class of cobalt containing alloys which are difficult to cut by conventional methods. The piece of M–252 (about 320 Brinell hardness) could not be cut deeper than ⅟₁₆ inch in 3 minutes on a bandsaw machine. A very smooth unsmeared metal surface was obtained by electrolytic cutoff such that metal defects at the center of the bar were clearly exposed, whereas the defects were hidden by smeared metal on a surface obtained by abrasive cutoff.

*Example VIII*

Cutoff of complex shapes by conventional methods often leaves a burr which must be removed in a subsequent operation. Using the same conditions as for Example I and a feed rate of 0.125 inch per minute, the following commercial articles were cut off:

(1) A hollow tube of Type 316 stainless steel with a hexagonal cross section, ⅝ inch across the flats and 0.020-inch wall.

(2) Type 316 stainless steel molding trim of U-shaped cross section, 0.020 inch wall thickness 1-inch base and ½-inch legs.

(3) A piece of ½-inch thick by 3 inches long "honeycomb" made from 0.003 inch 17–7PH stainless steel foil. The pieces obtained by electrolytic cutoff were completely free of burrs.

*Example IX*

Aluminum (Type 3S) extrusions were cut off using an electrolyte containing 380 grams per liter of sodium nitrate. The aluminum extrusion was about 0.060-inch thick and had a U-shaped cross section with base ¾ inch, one leg ¹¹⁄₁₆ inch, and the other leg 1³⁄₁₆ inch. The feed rate was 0.047 inch per minute and the voltage was 11 volts. The cut-off pieces were completely free of burrs.

A suitable electrolyte for M–252, A–286, 4340 steel and low-carbon steel comprises about 25 to 250 grams per liter of sodium chloride, NaCl, and about 2 to 25 grams per liter of boric acid, $H_3BO_3$. A near neutral solution, pH about 6.0–6.5, is desirable. The boric acid aids in buffering the solution so that it can be used repeatedly without an appreciable change in the pH. When iron is cut, the insoluble iron hydroxides that form in the solution can be removed by filtration to maintain the concentration of the sodium chloride in the electrolyte.

For cutting titanium, it is necessary to use special electrolytes. Titanium is well known for its corrosion resistance and is generally passive even under electrochemical attack. Many electrolyte compositions tend to form an insoluble current blocking film on titanium. A suitable electrolyte for cutting titanium comprises about 50 to 75 milliliters per liter of hydrofluoric acid, HF, specific gravity 1.20, about 75 to 125 milliliters per liter of nitric acid, $HNO_3$ specific gravity 1.42, and about 125 milliliters per liter of hydrochloric acid, HCl, specific gravity 1.19.

The present invention provides many advantages. Some of the advantages are:

A. Lack of burrs on cut pieces.

B. No surface metal contamination such as can occur in conventional machining when smeared metal can be strained and can entrap oil, dirt, or minute pieces of abraded tool.

C. No opportunity for chemical reaction of cutting tool with metal surface.

D. No heat damage to cut pieces. Temperature cannot exceed about 200° F. or the boiling point of the electrolyte. There was no measurable change in hardness of a cut surface of 4340 steel (550 B.H.N.).

E. Visual examination of the surface of each cut piece directly for inspection for metal defects is possible. Minute voids or metal defects along the axis of an M–252 sample which could not be seen on the cut surface produced by conventional methods, were exposed on the electrolytically cut surface, for direct inspection of every cut-off piece.

F. No need to purchase billets in the annealed condition since hardness does not affect electrolytic cutoff.

G. Possibility of recovery from the electrolyte of valuable metals used in high-temperature alloys.

H. One multiple electrolytic cutoff machine can be used for all alloys being cut, for various cross-sectional shapes, and for large and small billets.

I. Since there is negligible wear to change the disk diameter, large billets can be cut with the minimum tool diameter.

J. Power to overcome the friction of the work feed mechanism is sufficient since there is no tool pressure on the work to be maintained during cutoff.

K. Since the cutoff part of the operation is automatic, the method is adaptable to the trend in machine tool automation.

L. A relatively low operator skill is sufficient, as skill in sound, feel, or visual observation is not required. The progress of the electrolytic cutoff can be reported by electrical instruments.

While the forms of the invention herein disclosed constitute preferred embodiments, it is not intended herein to describe all of the possible equivalent forms or ramifications of the invention. It will be understood that the words used are words of description rather than of limitation, and that various changes may be made without departing from the spirit or scope of the invention.

What is claimed is:

1. Apparatus for electrolytically cutting into an electrically conductive mass, comprising in combination: means for connecting said mass to the positive side of a direct current supply; means for connecting to the negative side of said direct current supply at least one electrically conductive rotatable disk; means for locating said mass in close proximity to each said disk and for maintaining a gap of about 0.001 to 0.010 inch between the periphery of each said disk and the adjacent portion of said mass, by providing relative movement between said mass and each said disk in a plane parallel to the plane of said disk at a predetermined rate substantially equal to the rate at which material is removed from said mass adjacent to said gap; means for rotating each said disk at a peripheral speed of at least about 10,000 to 20,000 feet per minute; and means for supplying an electrically conductive electrolyte throughout each said gap, comprising means for supplying said electrolyte to at least one side of each said disk at a location spaced from the periphery thereof to form on said side a film from about 0.0005 to 0.005 inch thick of said electrolyte that is transported by centrifugal force from said location to said gap; in which said direct current supply furnishes a voltage of about 6 to 15 volts between each said disk and said mass, to provide a current density of at least about 150 to 1500 amperes per square inch through said electrolyte in each said gap; the region between each side of each said disk and the adjacent portion of said mass being maintained open to minimize the distance between said side and said mass and thus to minimize the thickness of the cut made in said mass adjacent to said disk.

2. Apparatus for electrolytically cutting into an electrically conductive mass, comprising in combination: means for connecting said mass to the positive side of a direct current supply; means for connecting to the negative side of said direct current supply a plurality of electrically conductive rotatable disks; means for locating said mass in close proximity to each said disk and for maintaining a gap of about 0.0005 to 0.025 inch between the periphery of each said disk and the adjacent portion of said mass by providing relative movement between said mass and each said disk in a plane parallel to the plane of said disk at a predetermined rate substantially equal to the rate at which material is removed from said mass adjacent to said gap; means for rotating said disks about a common axis at a peripheral speed of at least about 3000 feet per minute; and means for supplying an electrically conductive electrolyte to each side of each said disk at a location spaced from the periphery thereof to form on each said side a film of substantially uniform thickness of said electrolyte that is transported by centrifugal force from said location to said gap; in which said direct current supply furnishes a voltage of about 2 to 25 volts between each said disk and said mass, to provide a current density of at least about 50 to 2000 amperes per square inch through said electrolyte in each said gap.

3. A method of electrolytically cutting into an electrically conductive mass, comprising: connecting said mass to the positive side of a direct current supply; connecting to the negative side of said direct current supply at least one electrically conductive rotatable disk; locating said mass in close proximity to each said disk and maintaining a gap of about 0.0005 to 0.025 inch between the periphery of each said disk and the adjacent portion of said mass; rotating each said disk at a peripheral speed of at least about 3000 feet per minute; and supplying an electrically conductive electrolyte throughout each said gap by supplying said electrolyte to at least one side of each said disk at a location spaced from the periphery thereof to form on said side a film of substantially uniform thickness of said electrolyte that is transported by centrifugal force from said location to said gap.

4. A method according to claim 3, in which there is furnished from said direct current supply a voltage of about 2 to 25 volts between each said disk and said mass, to provide a current density of at least about 50 to 2000 amperes per square inch through said electrolyte in each said gap.

5. A method according to claim 3, in which is provided relative movement between said mass and each said disk in a plane parallel to the plane of said disk at a predetermined rate substantially equal to the rate at which material is removed from said mass adjacent to said gap.

6. A method according to claim 3, in which the region between each side of each said disk and the adjacent portion of said mass is maintained open to minimize the distance between said side and said mass and thus to minimize the thickness of the cut made in said mass adjacent to said disk.

7. A method of electrolytically cutting into an electrically conductive mass, comprising: connecting said mass to the positive side of a direct current supply; connecting to the negative side of said direct current supply at least one electrically conductive rotatable disk; locating said mass in close proximity to each said disk and maintaining a gap of about 0.001 to 0.010 inch between the periphery of each said disk and the adjacent portion of said mass; rotating each said disk at a peripheral speed of at least about 10,000 to 20,000 feet per minute; and supplying an electrically conductive electrolyte throughout each said gap by supplying said electrolyte to at least one side of each said disk at a location spaced from the periphery thereof to form on said side a film from about 0.0005 to 0.005 inch thick of said electrolyte that is transported by centrifugal force from said location to said gap; in which there is furnished from said direct current supply a voltage of about 6 to 15 volts between each said disk and said mass, to provide a current density of at least about 150 to 1500 amperes per square inch through said electrolyte in each said gap.

References Cited in the file of this patent

UNITED STATES PATENTS

| | | |
|---|---|---|
| 2,526,423 | Rudorff | Oct. 17, 1950 |
| 2,739,935 | Kehl et al. | Mar. 27, 1956 |
| 2,764,543 | Comstock | Sept. 25, 1956 |
| 2,793,992 | Heuser | May 28, 1957 |
| 2,798,846 | Comstock | July 8, 1957 |
| 2,826,540 | Keeleric | Mar. 11, 1958 |
| 2,827,427 | Barry | Mar. 18, 1958 |
| 2,871,177 | Comstock | Jan. 27, 1959 |
| 2,877,105 | Smith | Mar. 10, 1959 |
| 2,920,026 | Kistler | Jan. 5, 1960 |
| 2,939,825 | Faust | June 7, 1960 |

OTHER REFERENCES

The Engineer's Digest, vol. 3, No. 10, October 1946, p. 498.

Dedication 3,130,138.—*Charles L. Faust* and *John E. Clifford*, Columbus, Ohio. ELECTROLYTIC CUTTING. Patent dated Apr. 21, 1964. Dedication filed May 7, 1973, by the assignee, *The Battelle Development Corporation*.

Hereby dedicates to the People of the United States the entire remaining term of said patent.

[*Official Gazette October 30, 1973.*]